US011870529B2

(12) United States Patent
Harrison et al.

(10) Patent No.: US 11,870,529 B2
(45) Date of Patent: Jan. 9, 2024

(54) FULL POWER UL MIMO VIA MULTIPLE SRS RESOURCE GROUPS

(71) Applicant: TELEFONAKTIEBOLAGET LM ERICSSON (PUBL), Stockholm (SE)

(72) Inventors: Robert Mark Harrison, Grapevine, TX (US); Niklas Wernersson, Kungsängen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 450 days.

(21) Appl. No.: 17/283,310

(22) PCT Filed: Oct. 9, 2019

(86) PCT No.: PCT/IB2019/058607
§ 371 (c)(1),
(2) Date: Apr. 7, 2021

(87) PCT Pub. No.: WO2020/075090
PCT Pub. Date: Apr. 16, 2020

(65) Prior Publication Data
US 2022/0014252 A1 Jan. 13, 2022

Related U.S. Application Data

(60) Provisional application No. 62/743,577, filed on Oct. 10, 2018.

(51) Int. Cl.
| | |
|---|---|
| *H04B 7/0404* | (2017.01) |
| *H04B 7/0426* | (2017.01) |
| *H04B 7/0456* | (2017.01) |
| *H04B 7/06* | (2006.01) |
| *H04L 5/00* | (2006.01) |

(Continued)

(52) U.S. Cl.
CPC ........ *H04B 7/0691* (2013.01); *H04B 7/0404* (2013.01); *H04B 7/0426* (2013.01);
(Continued)

(58) Field of Classification Search
CPC ... H04B 7/02–12; H04B 17/0082–3913; H04J 11/0023–0093; H04J 2011/0003–0096; H04L 1/0001–248; H04L 5/0001–26; H04L 25/02–4975; H04L 2025/0335–03815; H04W 24/02–10; H04W 28/02–26;
(Continued)

(56) References Cited

PUBLICATIONS

SR and WO for PCT/IB2019/058607, Nov. 25, 2019.
(Continued)

*Primary Examiner* — Timothy J Weidner
(74) *Attorney, Agent, or Firm* — Ericsson Inc.

(57) ABSTRACT

According to one embodiment, a method at a transmitting device is provided. The method includes transmitting at least two groups of reference signals, wherein a first and a second group of the at least two groups each correspond to transmission on a plurality of antenna ports, the first group corresponds to a smaller number of antenna ports than the second group. The maximum combined power on the antenna ports may correspond to the first and second group is substantially the same. One or more of the antenna ports corresponding to the first group may be formed according to at least one of a first and a second mechanism. User equipment and base station comprising processing circuitry to perform steps of method according to the various embodiments are also provided.

7 Claims, 15 Drawing Sheets

(51) Int. Cl.
    *H04W 52/32* (2009.01)
    *H04W 52/34* (2009.01)
    *H04W 52/36* (2009.01)
    *H04W 52/42* (2009.01)
    *H04W 84/02* (2009.01)
    *H04W 88/02* (2009.01)
    *H04W 88/08* (2009.01)
    *H04W 92/02* (2009.01)
    *H04W 92/10* (2009.01)

(52) U.S. Cl.
    CPC ......... *H04B 7/0456* (2013.01); *H04L 5/0042* (2013.01); *H04L 5/0048* (2013.01); *H04W 52/325* (2013.01); *H04W 52/346* (2013.01); *H04W 52/367* (2013.01); *H04W 52/42* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
    CPC ... H04W 52/02–60; H04W 72/02–569; H04W 84/02–16; H04W 88/02–12; H04W 92/02–04; H04W 92/10
    See application file for complete search history.

(56) References Cited

PUBLICATIONS

Vivo: "Remaining details on beam measurement and reporting", 3GPP Draft; R1-1719769 Remaining Details on Beam Measurement and Report! NG, 3rd Generation Partnership Project (3GPP), Mobile Competence Centre, 650, Route Des Lucioles, F-06921 Sophia-Antipolis CED, vol. RAN WGI, No. Reno, USA; 20171127-20171201, Nov. 18, 2017 (Nov. 18, 2017), XP051369512, Nov. 18, 2017.

LG Electronics: "Text proposals on Reference Signals" , 3GPP Draft; R1-1808488, 3rd Generation Partnership Project (3GPP), Mobile Competence Centre ; 650, Route Des Lucioles ; F-06921 Sophia-Antipolis Cedex ; France, vol. RAN WGI, No. Gothenburg, Sweden; 20180820-20180824, Aug. 11, 2018.

Ericsson: "Enabling full TX power UL transmission for PUSCH", 3GPP Draft; R1-1811546 Enabling Full TX Power UL Transmission for PUSCH, 3rd Generation Partnership Project (3GPP), Mobile Competence Centre ; 650, Route Des Lucioles ; F-06921 Sophia-Antipolis Cedex, vol. RAN WGI, No. Chengdu, China; 20181008-20181012, Sep. 29, 2018.

Transmission structure of precoded spatial multiplexing mode in NR.

Precoding + CDD for a UE with 4 pairwise coherent antenna ports

FULL POWER UL MIMO VIA MULTIPLE SRS RESOURCE GROUPS

RELATED APPLICATIONS

This application claims the benefit of provisional patent application Ser. No. 62/743,577, filed Oct. 10, 2018, the disclosure of which is hereby incorporated herein by reference in its entirety.

TECHNICAL FIELD

The present disclosure relates to cellular communications systems and, more specifically, to full power uplink (UL) multi-input multi-output (MIMO).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The next generation mobile wireless communication system (5G) or new radio (NR), will support a diverse set of use cases and a diverse set of deployment scenarios. The later includes deployment at both low frequencies (100 s of MHz), similar to LTE today, and very high frequencies (mm waves in the tens of GHz).

Antenna Ports, Coherence, and Virtualization

When multi-antenna techniques is used, it is generally desirable to allow as much implementation freedom as possible so that different devices can be optimized for different use cases, form factors, construction cost, etc. Therefore multi-antenna operation in NR and LTE is described in terms of antenna ports. An antenna port is defined such that the channel over which a symbol on the antenna port is conveyed can be inferred from the channel over which another symbol on the same antenna port is conveyed.

An antenna port in a multi-antenna system can be formed by transmitting the same reference signal on multiple transmit chains. In this case, the received signal is a combination of the reference signal after it travels through each radio channel corresponding to each of the antennas of the transmit chains, as shown in the figure below. This combined signal appears as though it were transmitted by a single antenna with combined, or 'effective', channel and is therefore described as a single 'virtual' antenna. When transmitting on two antennas, there may be a difference in relative gain or phase. This is shown in FIG. 1 as the factor e, which can be expressed as a complex number $e=ge^{j\phi}$, where g is a positive real number representing gain and $\phi$ is a real number representing phase. The effective channel may then be given by: $h_c=h_1+eh_2$, where $h_1$ and $h_2$ are complex numbers identifying the channels to the first and second antennas, respectively. The channels $h_1$ and $h_2$ will vary according to the frequency on which they are measured in the presence of multipath, and therefore vary among resource elements of an LTE or NR signal. Similarly, e may vary across frequency, depending on the design of the UE tx chains. Herein channels are described as complex scalars, focusing on a single resource element for purposes of explanation.

If the factor e can be sufficiently well controlled, coherent transmission across the two transmit chains is said to be possible, and precoding or beamforming techniques can be used. Such techniques often set e to increase the received power of the effective channel, where the effective channel power may be described as $p_c=|h_c|^2$. Since coherent transmission allows greater received power, it is possible to use power amplifiers with lower power capability than if a single antenna is used. For example, assuming that the magnitudes of the two channels to the two antennas are the same and e is selected such that received signal from the second antenna is in phase with the first, then the power is 4 times higher than if the transmission were only on the first antenna, that is: $|h_1+eh_2|^2/|h_1|^2=|2h_1|^2/|h_1|^2=4$ Therefore, it is possible to transmit on each tx chain with half power when using coherent transmission, and still obtain two times more power than single antenna transmission.

If the factor e cannot be sufficiently well controlled, coherent transmission across the two transmit chains is not possible, but non-coherent transmission may be used instead. In this case, precoded transmissions on the two antennas do not necessarily provide a power gain, and instead may actually destructively combine to reduce the total power. The power in the effective channel is $|h_1+eh_2|^2=|h_1|^2-2Re(h_1^*eh_2)+|eh_2|^2$. If the term $2Re(h_1^*eh_2)=|h_1|^2+|h_2|^2$, then the received power is zero, while on the other hand if $-2Re(h_1^*eh_2)=|h_1|^2+|h_2|^2$, then the power is doubled. Assuming again that the power in each of the channels to the antennas is the same and that $|e|^2=1$, the power gain over single antenna transmission is $((2|h_1|^2-2Re\{h_1^*eh_2\}))/|h_1|^2$, which has a minimum value of 0 and a maximum value of 4. Assuming the channels are uncorrelated, the ratio of the average power of the combined power to that of the first antenna is $E\{(2|h_1|^2-2Re(h_1^*eh_2))/|h_1|^2\}=(2|h_1|^2)/|h_1|^2=2$. Therefore, if each antenna transmits at half power, and the channels are uncorrelated and equal power, the total power can be the same as when a single antenna is used. On the other hand, if the antennas are correlated, the power could be greater than or less than a single antenna, depending on the relative phase set by e. It can be observed then that the some, but not all, UE implementations can transmit on N transmit chains with N power amplifiers whose maximum power rating is $P_{max}/N$, where $P_{max}$ is the total power needed from the UE and that would need to be transmitted on a single transmit chain. UE implementations such as those with correlated antennas (for example those with $Re\{h_1^*eh_2\}\neq 0$), that transmit on multiple tx chains may produce less combined power than $P_{max}$ and so may require one of more of the power amplifiers on its N tx chains to have a maximum power rating greater than $P_{max}/N$.

Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in Release 15 NR is the support of MIMO antenna deployments and MIMO related techniques. NR supports uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 2 for where CP-OFDM is used on the uplink.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_{RX} \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2$$

where
$\hat{H}_n$ is a channel estimate, possibly derived from SRS.
$W_k$ is a hypothesized precoder matrix with index k.
$\hat{H}_n W_k$ is the hypothesized equivalent channel In closed-loop precoding for the NR uplink, the TRP transmits, based on channel measurements in the reverse link (uplink), TPMI to the UE that the UE should use on its uplink antennas. The gNodeB configures the UE to transmit SRS according to the number of UE antennas it would like the UE to use for uplink transmission to enable the channel measurements. A single precoder that is supposed to cover a large bandwidth (wideband precoding) may be signaled.

Other information than TPMI is generally used to determine the UL MIMO transmission state, such as SRS resource indicators (SRIs) as well as transmission rank indicator (TRIs). These parameters, as well as the modulation and coding state (MCS), and the uplink resources where PUSCH is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

Non-Codebook Based Precoding

NR also supports non-codebook based transmission/precoding for PUSCH in addition to codebook based precoding. For this scheme a set of SRS resources are transmitted where each SRS resource corresponds to one SRS port precoded by some precoder selected by the UE. The gNB can then measure the transmitted SRS resources and feedback to the UE one or multiple SRS resource indication (SRI) to instruct the UE to perform PUSCH transmission using the precoders corresponding to the referred SRS resources. The rank in this case will be determined from the number of SRIs feed back to the UE.

By configuring the UE with the higher layer parameter SRS-AssocCSIRS and with the higher layer parameter ulTxConfig set to 'NonCodebook', the UE may be configured with an NZP CSI-RS to utilize reciprocity to create the precoders used for SRS and PUSCH transmission. Hence by measuring on the specified CSI-RS the UE will be able to perform gNB transparent precoding based on reciprocity.

Another mode of operation is to instead let the UE choose the precoders such that each SRS resource corresponds to one UE antenna. Hence, in this case the SRS resource would be transmitted from one UE antenna at the time and the SRIs would hence correspond to different antennas. Thus, by choosing the UE precoders like this the gNB will be able to perform antenna selection at the UE by referring to the different SRIs which in turn will correspond to different antennas.

To summarize, non-codebook based precoding includes both antenna selection, and gNB transparent reciprocity based precoding.

UE Coherence Capability in NR

UE capabilities have been defined in Rel-15 NR for full coherence, partial coherence, and non-coherent transmission. These correspond to where all tx chains, pairs of tx chains, or none of the tx chains have sufficiently well controlled relative phase for codebook based operation. Full coherence, partial coherence, and non-coherent UE capabilities are identified according to the terminology of 3GPP TS 38.331 version 15.0.1 as 'fullAndPartialAndNonCoherent', 'partialCoherent', and 'nonCoherent', respectively. This terminology is used because a UE supporting fully coherent transmission is also capable of supporting partial and non-coherent transmission and because a UE supporting partially coherent transmission is also capable of supporting and non-coherent transmission. A UE can then be configured to transmit using a subset of the UL MIMO codebook that can be supported with its coherence capability. In 38.214 section 6.1.1, the UE can be configured with higher layer parameter ULCodebookSubset, which can have values 'fullAndPartialAndNonCoherent', 'partialAndNonCoherent', and 'nonCoherent', indicating that the UE uses subsets of a codebook that can be supported by UEs with fully coherent, partially coherent, and non-coherent transmit chains.

SRS Transmission in NR

Sounding reference signals are used for a variety of purposes in NR. One primary use case for SRS is for uplink channel state estimation, allowing channel quality estimation to enable uplink link adaptation (including determination of which MCS state the UE should transmit with) and/or frequency-selective scheduling. In the context of uplink MIMO, they can also be used to determine precoders and a number of layers that will provide good uplink throughput and/or SINR when the UE uses them for transmission on its uplink antenna array. Additional uses include power control, uplink timing advance adjustment, beam management, and reciprocity-based DL precoding.

Unlike LTE Rel-14, at least some NR UEs may be capable of transmitting multiple SRS resources. This is similar conceptually to multiple CSI-RS resources on the downlink: an SRS resource comprises one or more antenna ports, and the UE may apply a beamformer and/or a precoder to the antenna ports within the SRS resource such that they are transmitted with the same effective antenna pattern. A primary motivation for defining multiple SRS resources in the UE is to support analog beamforming in the UE where a UE can transmit with a variety of beam patterns, but only one at a time. Such analog beamforming may have relatively high directivity, especially at the higher frequencies that can be supported by NR.

In NR the SRS sequence is UE-specifically configured Zadoff-Chu based sequence and an SRS resource consists of 1 or 2 or 4 antenna ports. Another feature supported by NR is repetition of symbols within the resource with factor 1 or 2 or 4. This means that the transmission may be extended to multiple OFDM symbols which is intended for improving the UL coverage of the SRS. An SRS resource always spans 1 or 2 or 4 adjacent OFDM symbols and all ports are mapped to each symbol of the resource. SRS resources are mapped within the last 6 OFDM symbols of an uplink slot. SRS resources are mapped on either every second or every fourth subcarrier, that is with so-called comb levels either 2 or 4. SRS resources are configured in SRS resource sets which contain one or multiple SRS resources.

UL Power Control

Setting output power levels of transmitters, base stations in downlink and mobile stations in uplink, in mobile systems is commonly referred to as power control (PC). Objectives of PC include improved capacity, coverage, improved system robustness, and reduced power consumption.

In LTE PC mechanisms can be categorized in to the groups (i) open-loop, (ii) closed-loop, and (iii) combined open- and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In brief the UL power control framework could be described as a framework that derives a power P that relates to the output power of an UL transmission. Typically, the value P is scaled to another value P' that may represent power per port, power per layer or something similar. This scaled value is then used in the actual UL transmission in a corresponding way. It is also noted that P is typically upper limited by some value Pcmax, which may depend on time, meaning that P=Pcmax will typically correspond to the maximal UL power that the UE can transmit with (depending on the power scaling).

SUMMARY

There currently exist certain challenge(s).

One solution to allow full transmit power when fully coherent transmission is not supported in the UE is to transmit on multiple tx chains such that the transmit power combines, as described above. This is proposed in 3GPP document R1-1811279, an excerpt of which is the following (refer also to FIGS. 3 and 4, respectively): "In particular, we envision a two-step process wherein the UE first precodes the transmit signal using the assigned precoder, followed by the application of a transparent diversity scheme across the non-coherent sets of antennas. This process is illustrated in the two figures for a UE with 2 non-coherent antenna ports and a UE with 4 pairwise-coherent antenna ports."

This approach attempts to address the antenna correlation problem described above through the use of cyclic delay diversity (CDD). It is noted that this is equivalent to by varying the precoding the in frequency domain, and so attempts to set the average value across frequency of $Re\{h_1^*eh_2\}$ to be as close to zero as possible. One drawback of varying the precoding across frequency in this way include that it increases channel estimation error, since the gNB does not have a channel estimate to each of the transmitting antennas and since varying the effective channel through this precoding limits the amount of frequency domain averaging that can be used by the gNB to increase the channel estimate accuracy. Moreover when the PUSCH transmission is relatively narrowband, varying the precoding in this way could severely distort the channel estimation.

Another drawback is that this approach requires the use of a codebook, and so is not suitable for NR non-codebook based UL MIMO transmission. It should be noted that R1-1811279 contemplates virtualizing SRS transmitted on multiple tx chains together, as in the following excerpt: "With option 2, UE use additional SRS port to sound $h_0+h_1 e^{j2\pi fr}$ explicitly. Since anyway eNB can synthesize the S-CDD channel by itself the additional sounding port is not necessary from SRS resource saving and UE power saving point of view."

Virtualization is understood to be used in some non-codebook based transmission implementations, and the non-codebook based operation is designed to include support for virtualization. However, virtualizing antenna ports is insufficient to allow full power non-codebook based operation.

Existing solutions do not adequately support non-coherent transmission in UEs that can combine transmit power across their tx chains and those that cannot.

Certain aspects of the present disclosure and their embodiments may provide solutions to these or other challenges. According to some aspects of the present disclosure, the following is provided.

Embodiment Set 1

The UE configures two groups of reference signals, where the first group corresponds to a smaller number of antenna ports than the second group. In one particular embodiment, these two groups could be overlapping. For transmission of these reference signals it may be so that:
  the maximum combined power on the antenna ports corresponding to the first and second group respectively are the same, or
  the maximum total power on all antenna ports corresponding for the first and second group respectively are the same, or
  the maximum power per port for the first and second group respectively are the same, or
  the maximum power per port for the first group is the larger than the maximum power per port for the second group.

One or more of the antenna ports corresponding to the first group is formed according to at least one of a first and a second mechanism, wherein the first mechanism comprises simultaneously transmitting on multiple transmit chains to form the antenna port and the second mechanism comprises transmitting on an antenna port corresponding to the second group on a transmit chain of a plurality of transmit chains, the transmit chain being capable of higher power transmission than other transmit chains in the plurality of transmit chains. The reference signal groups comprise at least one of an SRS resource containing at least one SRS port, an SRS resource set containing a plurality of SRS resources, each of which contains at least one SRS antenna port, and N DMRS ports associated with N layers of a PUSCH transmission.

In some example embodiments, when the UE transmits the first antenna port according to the first mechanism, it transmits a first reference signal in a first reference signal group on a first and a second tx chain with power $$\frac{p_1}{2}$$

on each tx chain and a second and a third reference signal in a second reference signal group on the first and second tx chains, respectively, at power $$\frac{p_1}{2}.$$

When the UE transmits the first reference signal according to the second mechanism, it transmits on a first tx chain, at power $P_1$ and a second and a third reference signal in a second reference signal group on the first second tx chains, respectively, at power $$\frac{p_1}{2}.$$

In other embodiments, the UE transmits the second and a third reference signal in the second reference signal port group at powers $P_2$ and $P_3$ respectively, where $P_2 > P_3$.

In some embodiments, when the one or more of the antenna ports is transmitted according to the first mechanism, the UE applies a phase shift to frequency domain reference elements carrying the reference signal on a first but not a second tx chain of the multiple tx chains. Such embodiments may control the antenna pattern generated through the first and second tx chains, such that the combined power at various azimuths and elevations is relatively constant.

It may be so that for PUSCH transmission, relating to one of the two reference signal groups, the maximum transmitted power for PUSCH is the same regardless of which reference signal group the PUSCH transmission relates to. It may also be so that for a given rank of the PUSCH transmission the maximum transmitted power for PUSCH is higher when the PUSCH transmission relates to the first group of reference signal than when it relates to the second group of reference signal.

In some embodiments, the power $P_i$ for layer i of an L layer PUSCH transmission is set to P/L, where P is the total power to be used for PUSCH transmission. In some such embodiments, the UE is configured to either transmit PUSCH layer i with power $P_i=P/L$ or with $P_i=PR/L$, where R=M/K and M is a number of antenna ports with non-zero PUSCH transmission and K is one of a maximum number of PUSCH layers supported by the UE, a number of antenna ports used in a codebook configured for the UE, a maximum rank configured to the UE, and a number of SRS ports configured to the UE for either or both of codebook and non-codebook based operation. In yet another embodiment the UE will transmit PUSCH layer i with power $P_i=P/L$ when the PUSCH transmission relates to the first group of reference signal whereas the UE will transmit PUSCH layer i with power $P_i=PR/L$ if the PUSCH transmission relates to the second group of reference signals. In one such embodiment the reference signal groups are configured with information that may be used to decide how to scale a total power P to obtain the power $P_i$ per layer. This configuration may be done via higher layer. In another embodiment this information is instead specified; it may for instance be so that port 0, and related reference signal groups, should scale its power in one way whereas port 1-3, and related reference signal groups, one should scale the power in one other way.

In some embodiments supporting codebook based operation, each reference signal group is an SRS resource, and at least one of a codebook and a maximum transmission rank is selected using an SRS resource indication.

In some embodiments supporting non-codebook based operation, a reference signal group is an SRS resource set, SRI indicates SRS resources from different SRS resource sets, wherein only SRS resources in one SRS resource set are indicated at a time.

In one embodiment the first group of reference signal is, partly or completely, common with the second group of reference signals. In one such embodiment, supporting non-codebook based operation, the first and second reference signal groups constitute two SRS resource sets where both SRS resource sets contains a common (shared) SRS resource.

Embodiment Set 2

The UE transmits a first and a reference signal corresponding to a first and a second antenna port at powers $P_1$ and $P_2$ respectively, where $P_1=P_2$ when a condition is true, and the UE determines the ratio $P_1/P_2$ condition is not true. The condition may test if the power of a transmission from the UE on multiple tx chains is less than a threshold $P_{thld}$, which is defined as $P_{thld}=P_{cmax}$ C where $P_{cmax}$ is the maximum power that the UE can transmit and C is a constant. In some embodiments C is the number of tx chains in the UE, the maximum number of layers that the UE can transmit.

Systems and methods for transmitting on multiple antennas are disclosed. According to one embodiment, a method at a transmitting device comprises transmitting (or configuring) at least two groups of reference signals, wherein: a first and a second group of the at least two groups each correspond to transmission on a plurality of antenna ports, the first group corresponds to a smaller number of antenna ports than the second group. The maximum combined power on the antenna ports may correspond to the first and second group is substantially the same. One or more of the antenna ports corresponding to the first group may be formed according to at least one of a first and a second mechanism. The first mechanism may comprise simultaneously transmitting on multiple transmit chains to form the antenna port. The second mechanism may comprise transmitting on an antenna port corresponding to the second group on a transmit chain of a plurality of transmit chains, wherein the transmit chain is capable of higher power transmission than other transmit chains in the plurality of transmit chains.

In some embodiments, the reference signal groups comprise at least one of: an SRS resource containing at least one SRS port, an SRS resource set containing a plurality of SRS resources, each of which contains at least one SRS antenna port, and N DMRS ports associated with N layers of a PUSCH transmission.

In some embodiments, the transmitting device is configurable or configured to transmit a layer i of an L layer PUSCH either at a power $P_i=P/L$, where P is the total power to be used for PUSCH transmission, and/or $P_i=PR/L$, where $R=M/K$, M is a number of antenna ports with non-zero PUSCH transmission, and K is one of: a maximum number of PUSCH layers supported by the UE, a number of antenna ports used in a codebook configured for the UE, a maximum rank configured to the UE, and a number of SRS ports configured to the UE for either or both of codebook and non-codebook based operation.

In some embodiments, transmitting according to codebook based operation, wherein, optionally, each reference signal group is an SRS resource and/or at least one of a codebook and a maximum transmission rank is selected using an SRS resource indication.

In some embodiments, transmitting according to non-codebook based operation, wherein, optionally, a reference signal group is an SRS resource set and/or SRI indicates SRS resources from different SRS resource sets, and/or only SRS resources in one SRS resource set are indicated at a time.

User equipment and base station comprising processing circuitry to perform steps of method according to the various embodiments are also provided.

Certain embodiments may provide none, one or more of the following technical advantages: Full power transmission is enabled for a variety of UE implementations that do not support coherent operation; UEs that can combine power non-coherently across Tx chains as well as implementations requiring higher power than would be needed for single antenna are supported.

Some embodiments of the disclosure support use of both codebook and non-codebook based operation.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
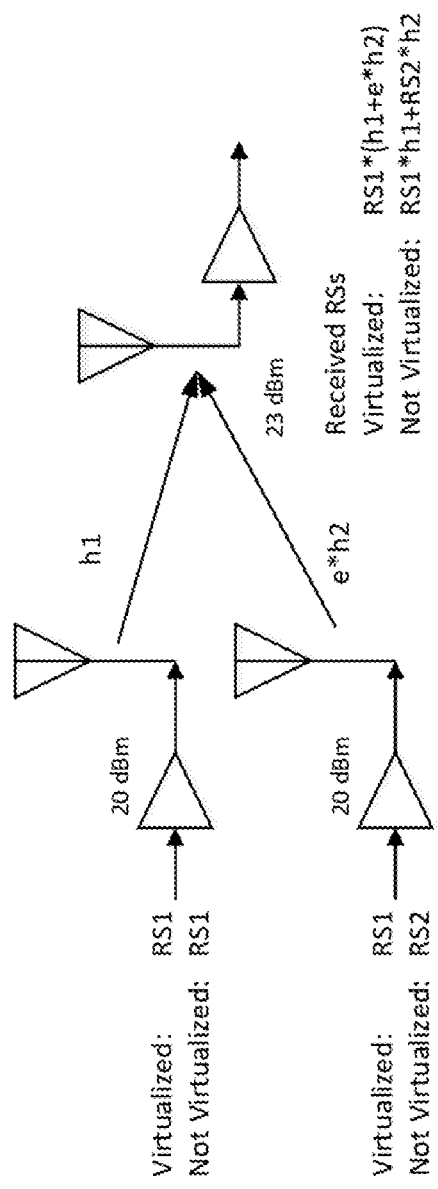
FIG. 1 is a diagram of signaling in a multi-antenna system according to some embodiments.
Figure 2:
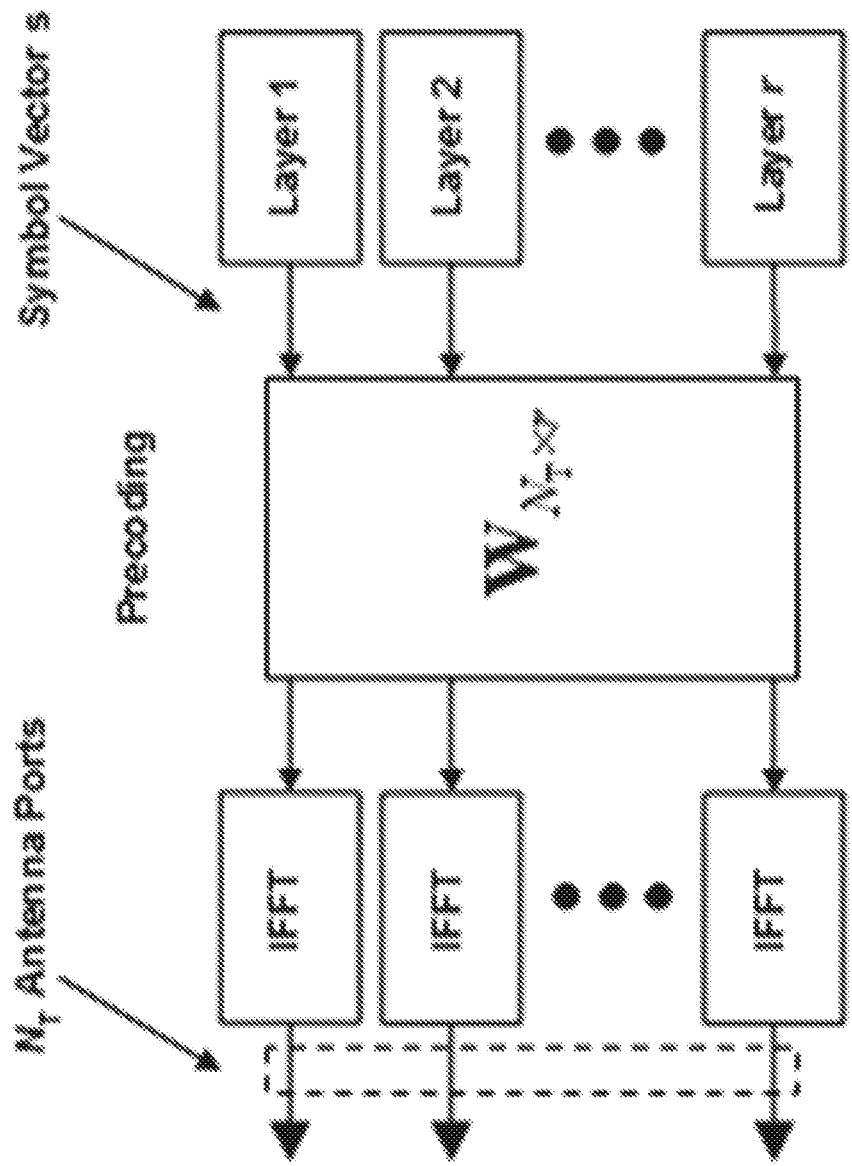
FIG. 2 illustrates the transmission structure of precoded spatial multiplexing mode in NR according to some embodiments.
Figure 3:
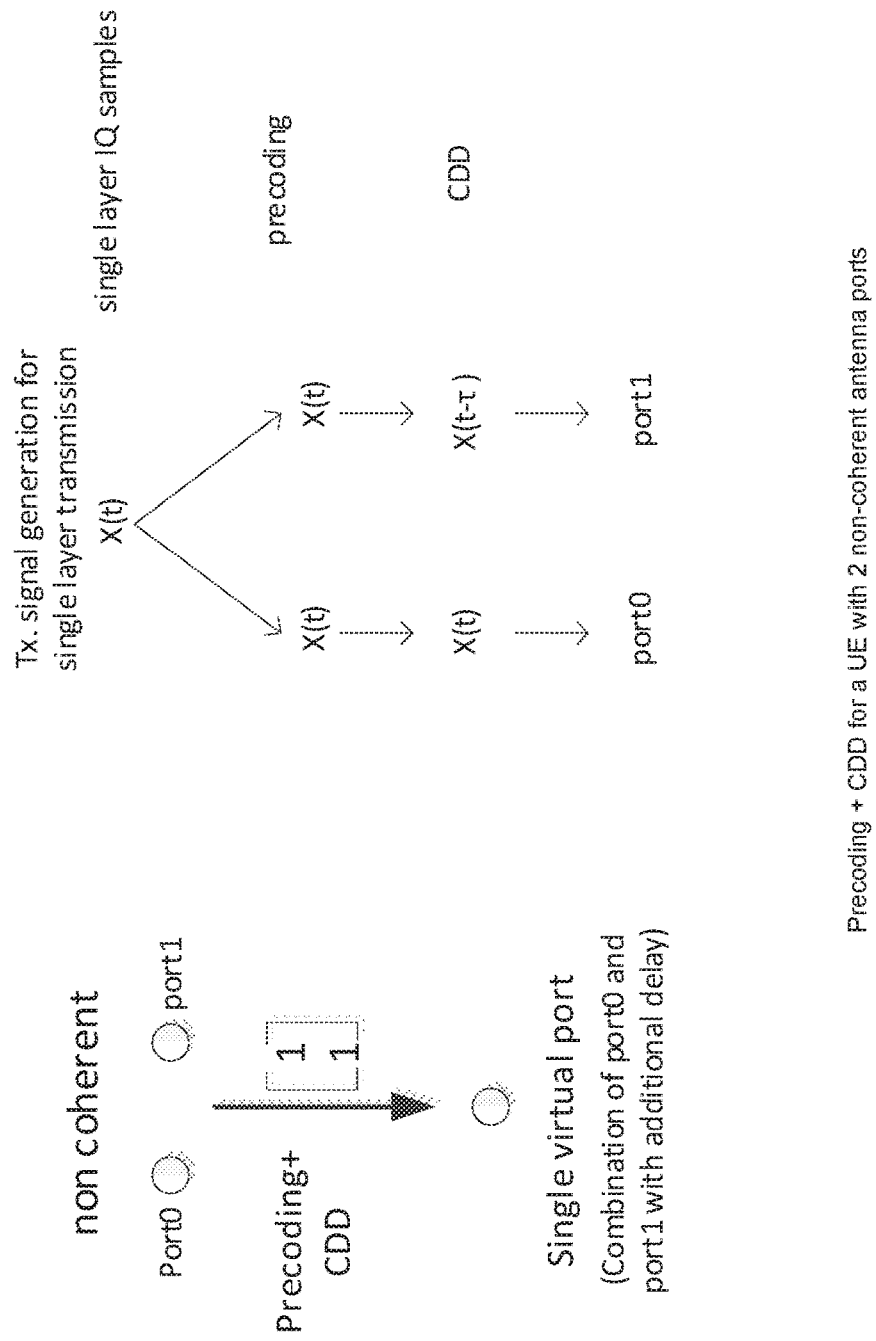
FIG. 3 illustrates precoding with cyclic delay diversity (CDD) for a UE with 2 non-coherent antenna ports according to some embodiments.
Figure 4:
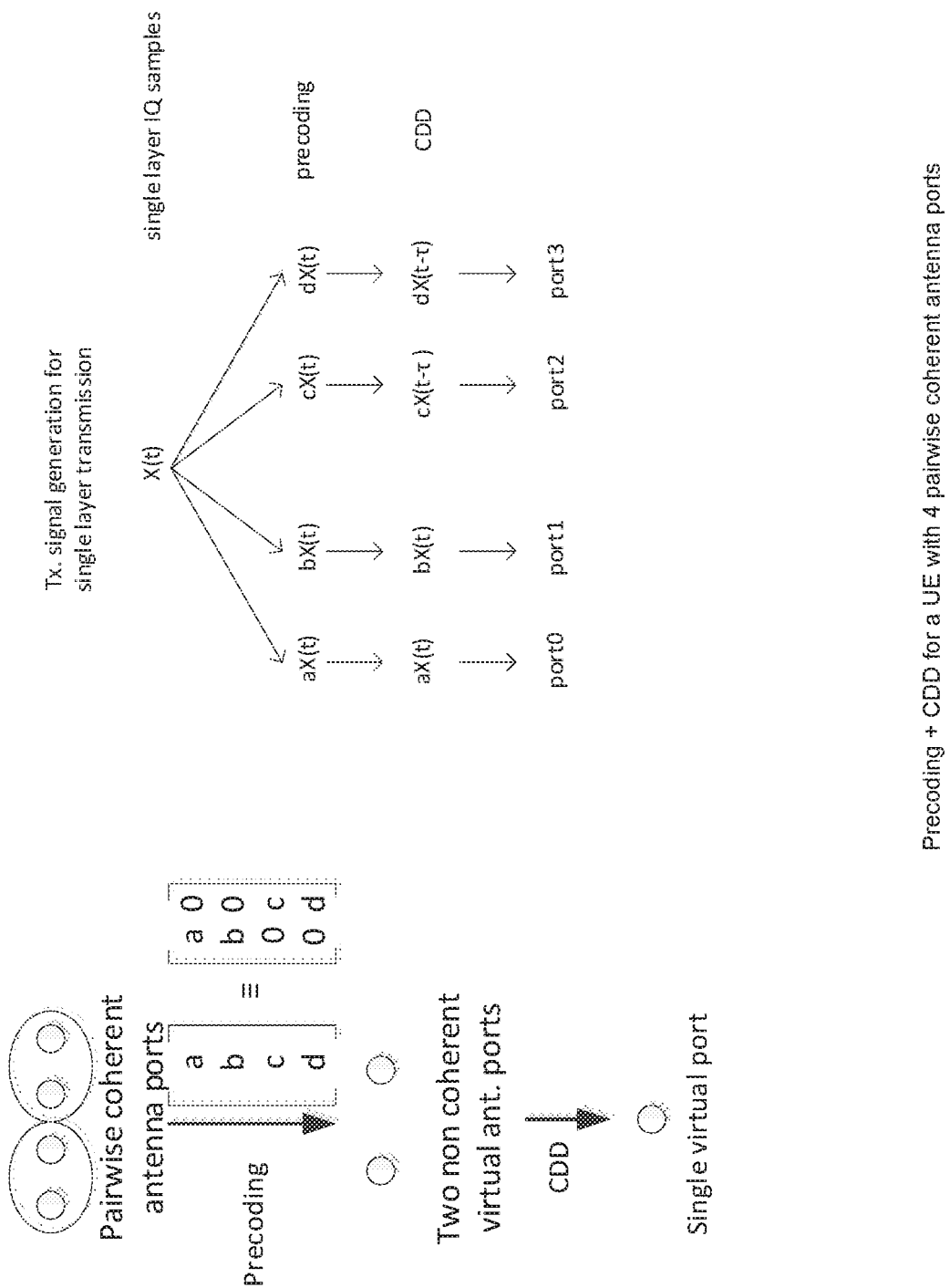
FIG. 4 illustrates precoding with cyclic delay diversity (CDD) for a UE with 4 pairwise coherent antenna ports according to some embodiments.
Figure 5:
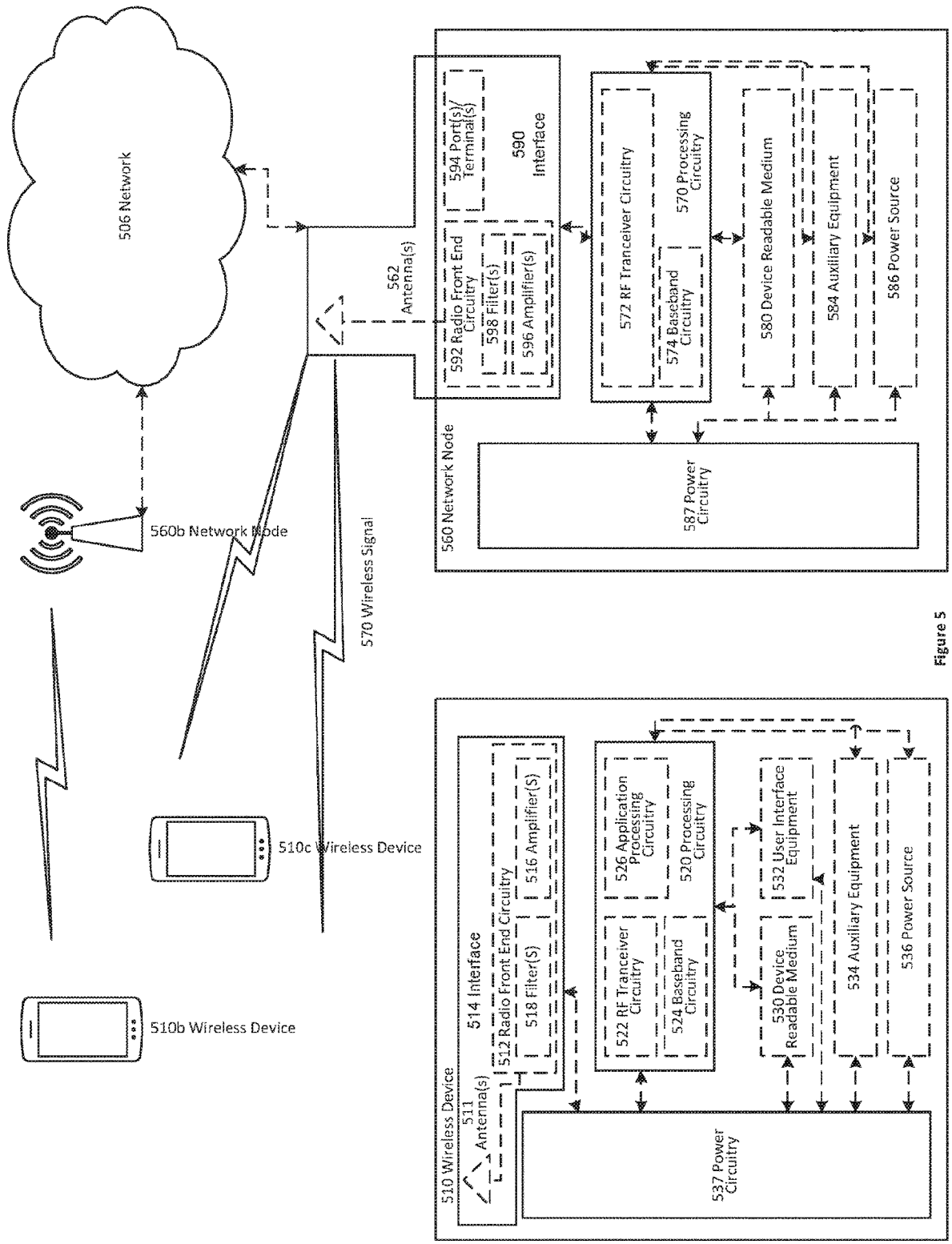
FIG. 5 is a wireless network, according to some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
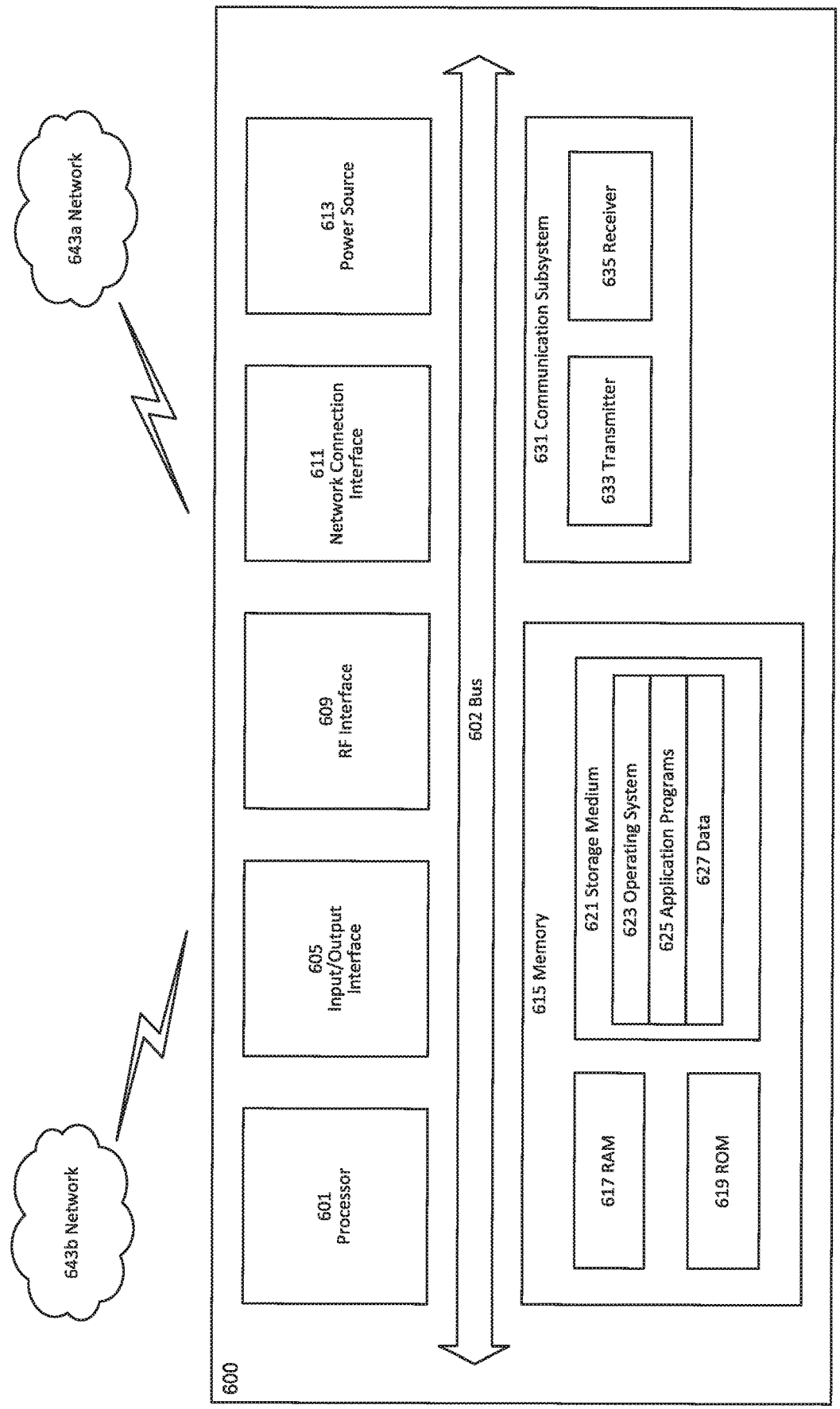
FIG. 6 is a user equipment, according to some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the 3rd Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643*a*. Network 643*a* may encompass wired and/or wireless networks such as a local-area network (LAN), a wide-area network (WAN), a computer network, a wireless network, a telecommunications network, another like network or any combination thereof. For example, network 643*a* may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643*b* using communication subsystem 631. Network 643*a* and network 643*b* may be the same network or networks or different network or networks. Communication subsystem 631 may be configured to include one or more transceivers used to communicate with network 643*b*. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.6, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643*b* may encompass wired and/or wireless networks such as a local-area network (LAN), a wide-area network (WAN), a computer network, a wireless network, a telecommunications network, another like network or any combination thereof. For example, network 643*b* may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
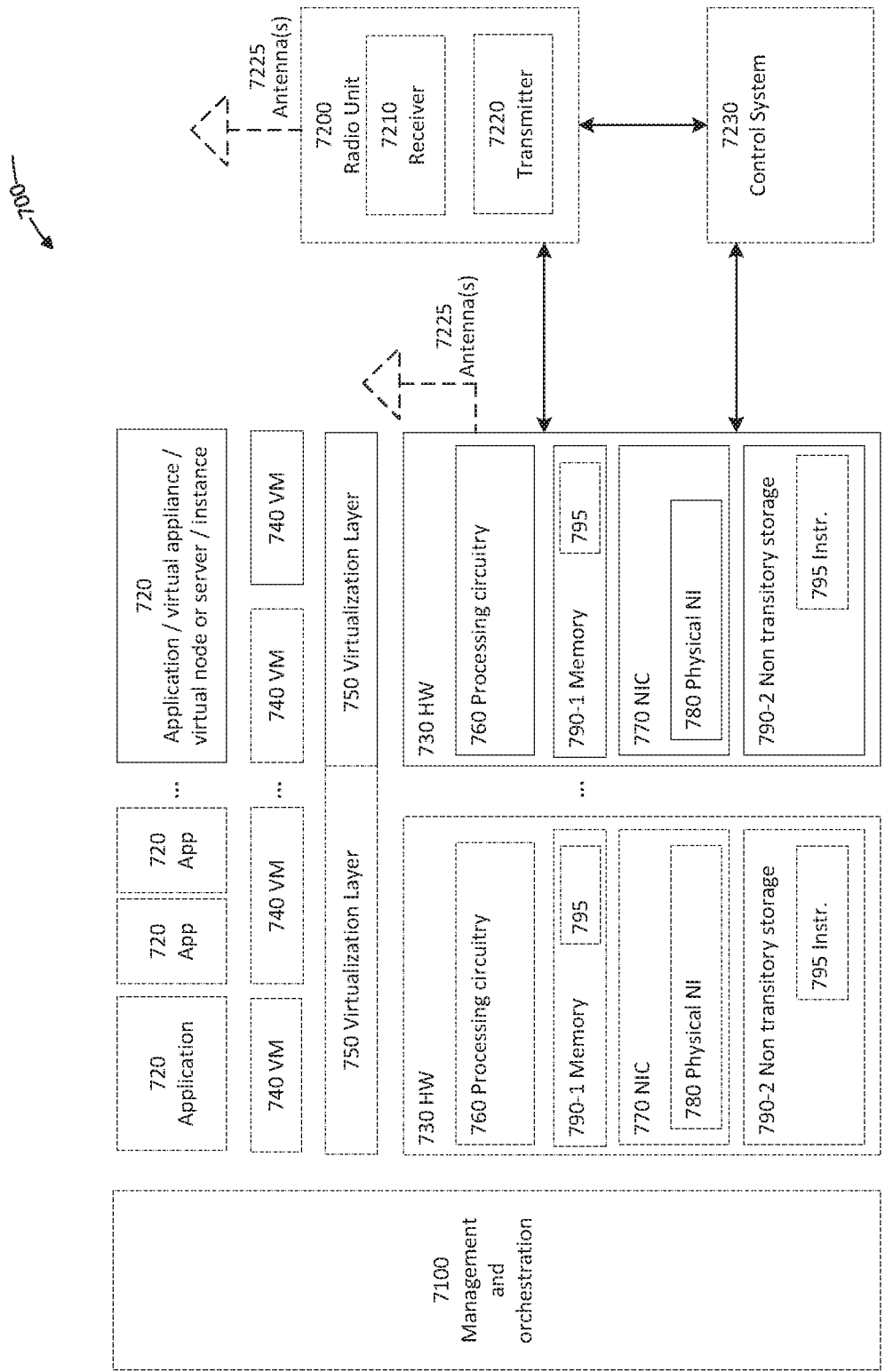
FIG. 7 is a schematic block diagram illustrating a virtualization environment, according to some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be effected with the use of control system 7230 which may alternatively be used for communication between the hardware nodes 730 and radio units 7200.

Figure 8:
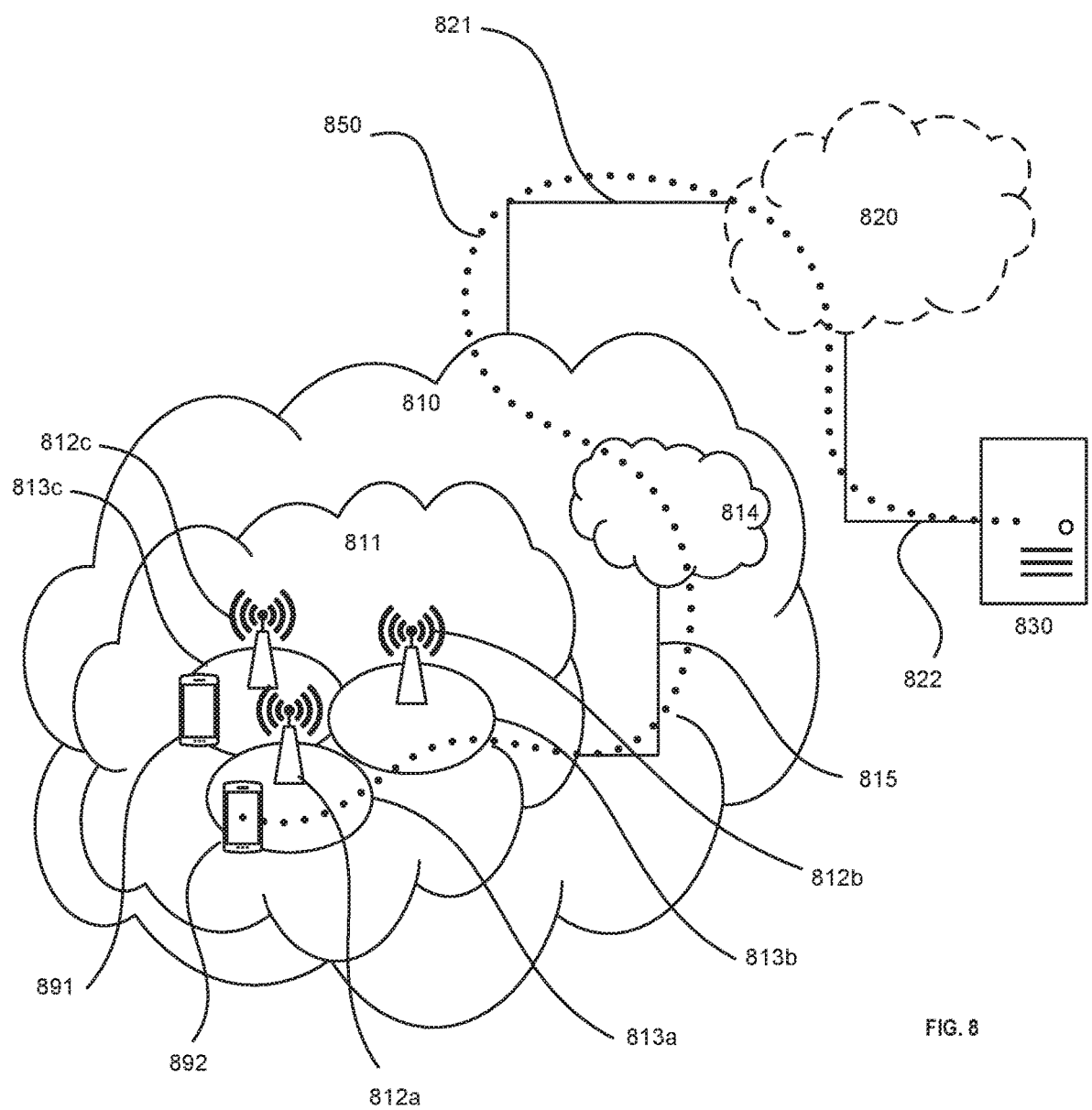
FIG. 8 is a communication system, according to some embodiments.

With reference to FIG. 8, a communication system in accordance with an embodiment is shown. The illustrated communication system includes telecommunication network 810, such as a 3GPP-type cellular network, which comprises access network 811, such as a radio access network, and core network 814. Access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to core network 814 over a wired or wireless connection 815. A first UE 891 located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signalling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
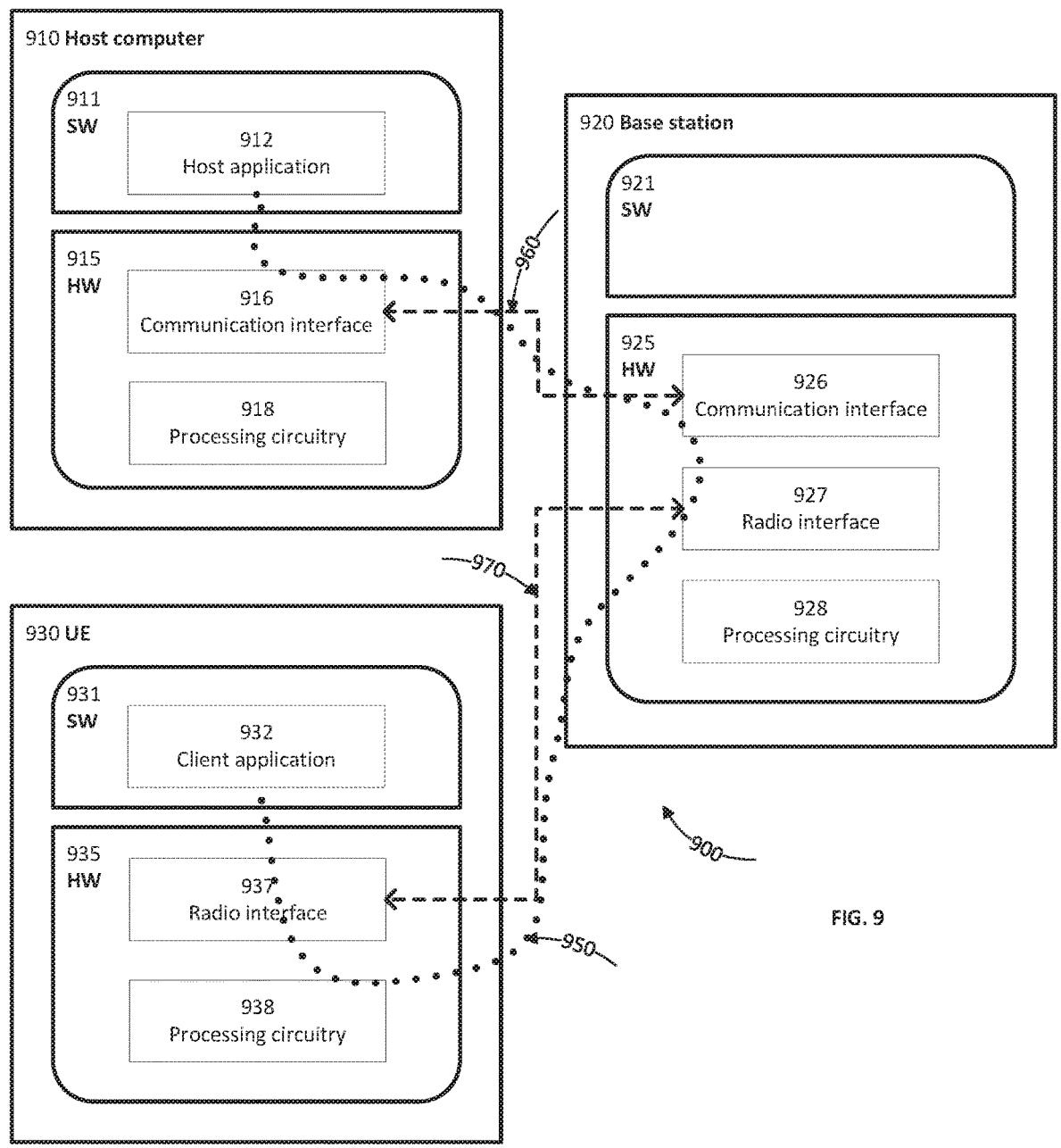
FIG. 9 illustrates example implementations of a user equipment, base station, and host computer, according to some embodiments.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the latency and reliability and thereby provide benefits such as reduced user waiting time, relaxed restriction on file size, better responsiveness, etc.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signalling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
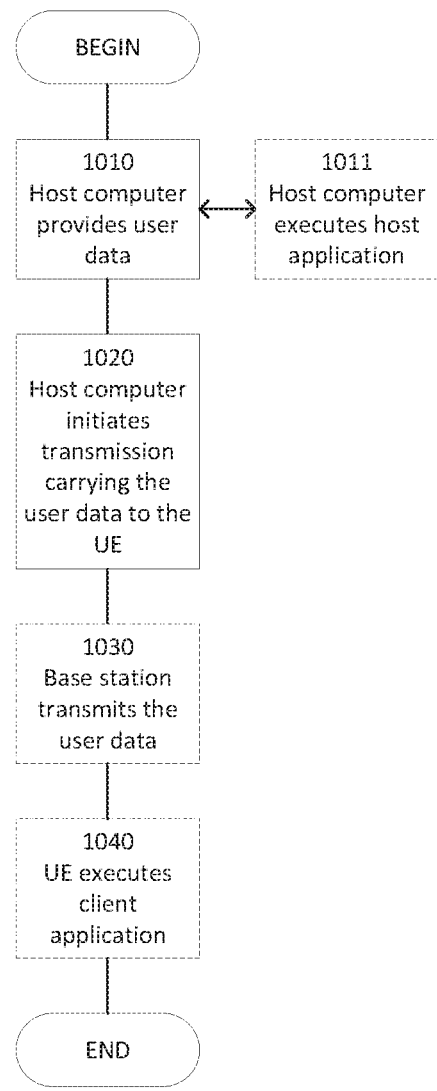
FIG. 10 is a flowchart illustrating a method implemented in a communication system, according to some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
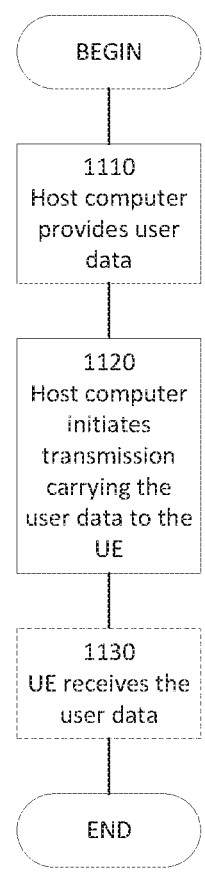
FIG. 11 is a flowchart illustrating a method implemented in a communication system, according to some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
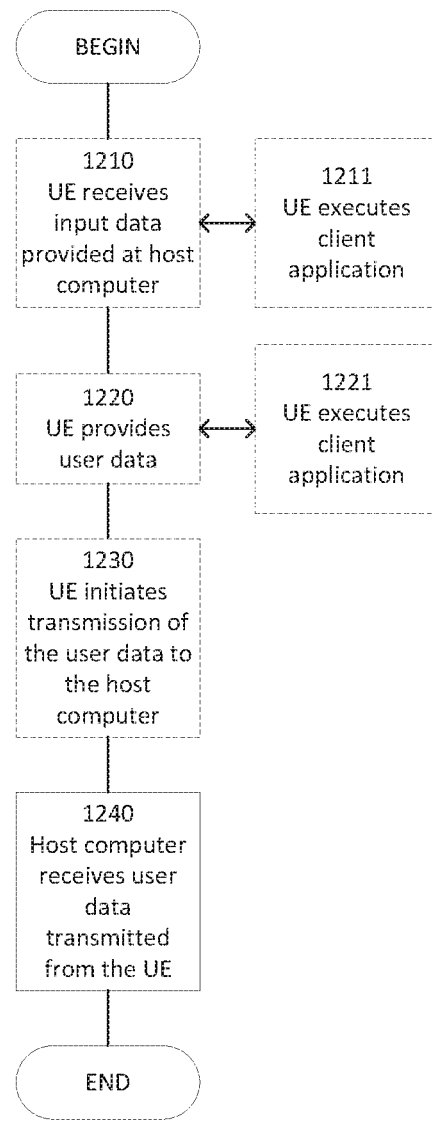
FIG. 12 is a flowchart illustrating a method implemented in a communication system, according to some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
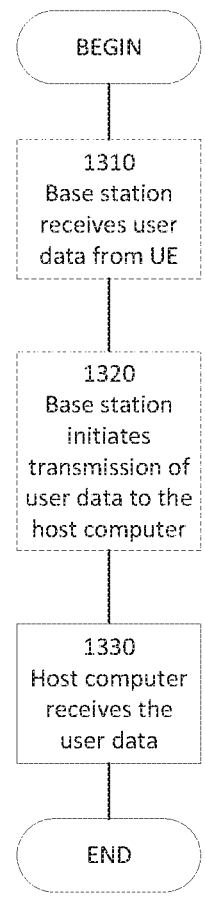
FIG. 13 is a flowchart illustrating a method implemented in a communication system, according to some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
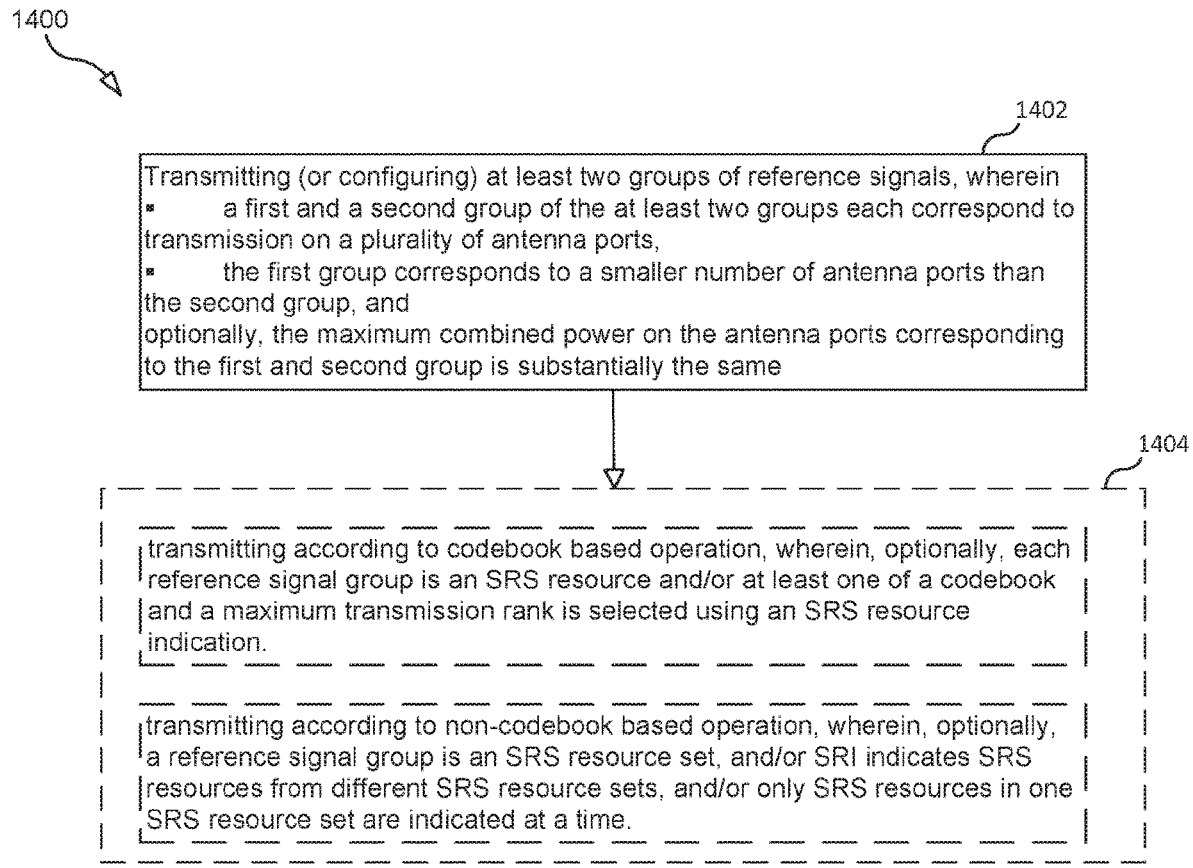
FIG. 14 is a flow diagram for transmitting on multiple antennas according to some embodiments.

FIG. 14 is a flow diagram for transmitting on multiple antennas according to some embodiments. In some embodiments, the method 1400 of FIG. 14 is performed by a wireless device or UE. At step 1402, the WD transmits (or configures) at least two groups of reference signals, wherein a first and a second group of the at least two groups each correspond to transmission on a plurality of antenna ports, the first group corresponds to a smaller number of antenna ports than the second group, and optionally, the maximum combined power on the antenna ports corresponding to the first and second group is substantially the same. At optional step 1404, the WD transmitting according to codebook based operation, wherein, optionally, each reference signal group is an SRS resource and/or at least one of a codebook and a maximum transmission rank is selected using an SRS resource indication and/or transmits according to non-codebook based operation, wherein, optionally, a reference signal group is an SRS resource set, and/or SRI indicates SRS resources from different SRS resource sets, and/or only SRS resources in one SRS resource set are indicated at a time.

Figure 15:
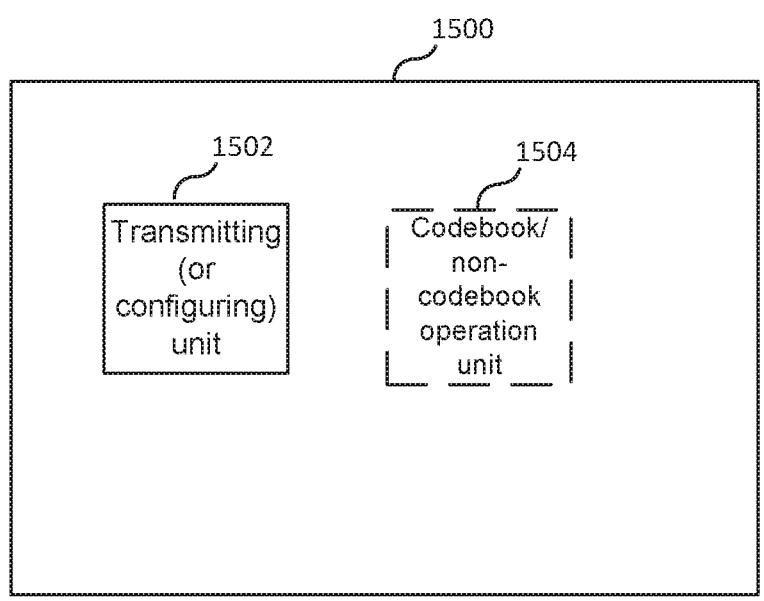
FIG. 15 is a schematic block diagram of an apparatus, according to some embodiments.

FIG. 15 illustrate a schematic block diagram of an apparatuses 1500, in a wireless network (for example, the wireless network shown in FIG. 5). The apparatus may be implemented in a wireless device or network node (e.g., wireless device 510 or network node 560 shown in FIG. 5). Apparatus 1500, is operable to carry out the example methods described with reference to FIG. 14 and possibly any other processes or methods disclosed herein. It is also to be understood that the methods of FIG. 14 are not necessarily carried out solely by apparatuses 1500. At least some operations of the method can be performed by one or more other entities.

Virtual apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a transmitting (or configuring) unit 1502, an optional codebook/non-codebook operation unit 1504, perform corresponding functions according one or more embodiments of the present disclosure.

As illustrated in FIG. 15, apparatus 1500 includes a transmitting (or configuring) unit 1502 configured to transmit (or configure) at least two groups of reference signals, and an optional codebook/non-codebook operation unit 1504 configured to transmit according to codebook based operation and/or according to non-codebook based operation.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

OTHER EMBODIMENTS

Group T Embodiments

T1. A method at a transmitting device for transmitting on multiple antennas, comprising
 Transmitting at least two groups of reference signals, wherein
  a first and a second group of the at least two groups each correspond to transmission on a plurality of antenna ports,
  the first group corresponds to a smaller number of antenna ports than the second group, and
  the maximum combined power on the antenna ports corresponding to the first and second group is the same;
 One or more of the antenna ports corresponding to the first group is formed according to at least one of a first and a second mechanism, wherein
  the first mechanism comprises simultaneously transmitting on multiple transmit chains to form the antenna port, and
  the second mechanism comprises transmitting on an antenna port corresponding to the second group on a transmit chain of a plurality of transmit chains, wherein the transmit chain is capable of higher power transmission than other transmit chains in the plurality of transmit chains;

T2. The method of embodiment T1, wherein the reference signal groups comprise at least one of
an SRS resource containing at least one SRS port,
an SRS resource set containing a plurality of SRS resources, each of which contains at least one SRS antenna port, and
N DMRS ports associated with N layers of a PUSCH transmission.

T3. The method of embodiment T1, wherein the UE is configured to transmit a layer i of an L layer PUSCH either at a power
$P_i=P/L$, where P is the total power to be used for PUSCH transmission, or
$P_i=PR/L$, where R=M/K, M is a number of antenna ports with non-zero PUSCH transmission, and K is one of:
a maximum number of PUSCH layers supported by the UE,
a number of antenna ports used in a codebook configured for the UE,
a maximum rank configured to the UE, and
a number of SRS ports configured to the UE for either or both of codebook and non-codebook based operation.

T4. The method of embodiment T1, further comprising transmitting according to codebook based operation, wherein each reference signal group is an SRS resource and at least one of a codebook and a maximum transmission rank is selected using an SRS resource indication.

T5. The method of embodiment T1, further comprising transmitting according to non-codebook based operation, wherein a reference signal group is an SRS resource set, SRI indicates SRS resources from different SRS resource sets, and only SRS resources in one SRS resource set are indicated at a time.

Group A Embodiments

A1. A method at a transmitting device for transmitting on multiple antennas, comprising transmitting (or configuring) at least two groups of reference signals, wherein
a first and a second group of the at least two groups each correspond to transmission on a plurality of antenna ports,
the first group corresponds to a smaller number of antenna ports than the second group, and
optionally, the maximum combined power on the antenna ports corresponding to the first and second group is substantially the same,
wherein, optionally, one or more of the antenna ports corresponding to the first group is formed according to at least one of a first and a second mechanism, wherein,
optionally, the first mechanism comprises simultaneously transmitting on multiple transmit chains to form the antenna port, and/or
optionally, the second mechanism comprises transmitting on an antenna port corresponding to the second group on a transmit chain of a plurality of transmit chains, wherein the transmit chain is capable of higher power transmission than other transmit chains in the plurality of transmit chains.

A2. The method of embodiment A1, wherein the reference signal groups comprise at least one of:
an SRS resource containing at least one SRS port,
an SRS resource set containing a plurality of SRS resources, each of which contains at least one SRS antenna port, and
N DMRS ports associated with N layers of a PUSCH transmission.

A3. The method of embodiment A1, wherein the transmitting device is configurable or configured to transmit a layer i of an L layer PUSCH either at a power
$P_i=P/L$, where P is the total power to be used for PUSCH transmission, and/or
$P_i=PR/L$, where R=M/K, M is a number of antenna ports with non-zero PUSCH transmission, and K is one of:
a maximum number of PUSCH layers supported by the UE,
a number of antenna ports used in a codebook configured for the UE,
a maximum rank configured to the UE, and
a number of SRS ports configured to the UE for either or both of codebook and non-codebook based operation.

A4. The method of embodiment A1, further comprising transmitting according to codebook based operation, wherein, optionally, each reference signal group is an SRS resource and/or at least one of a codebook and a maximum transmission rank is selected using an SRS resource indication.

A5. The method of embodiment A1, further comprising transmitting according to non-codebook based operation, wherein, optionally, a reference signal group is an SRS resource set and/or SRI indicates SRS resources from different SRS resource sets, and/or only SRS resources in one SRS resource set are indicated at a time.

Group B Embodiments

B1. A user equipment comprising:
processing circuitry configured to perform any of the steps of any of the Group A embodiments.

B2. A base station comprising:
processing circuitry configured to perform any of the steps of any of the Group A embodiments.

C3. A user equipment (UE) UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Abbreviations

At least some of the following abbreviations may be used in this disclosure. If there is an inconsistency between abbreviations, preference should be given to how it is used above. If listed multiple times below, the first listing should be preferred over any subsequent listing(s).

- 1×RTT CDMA2000 1×Radio Transmission Technology
- 3GPP 3rd Generation Partnership Project
- 5G 5th Generation
- ABS Almost Blank Subframe
- ARQ Automatic Repeat Request
- AWGN Additive White Gaussian Noise
- BCCH Broadcast Control Channel
- BCH Broadcast Channel
- CA Carrier Aggregation
- CC Carrier Component
- CCCH SDU Common Control Channel SDU
- CDMA Code Division Multiplexing Access
- CGI Cell Global Identifier
- CIR Channel Impulse Response
- CP Cyclic Prefix
- CPICH Common Pilot Channel
- CPICH Ec/No CPICH Received energy per chip divided by the power density in the band
- CQI Channel Quality information
- C-RNTI Cell RNTI
- CSI Channel State Information
- DCCH Dedicated Control Channel
- DL Downlink
- DM Demodulation
- DMRS Demodulation Reference Signal
- DRX Discontinuous Reception
- DTX Discontinuous Transmission
- DTCH Dedicated Traffic Channel
- DUT Device Under Test
- E-CID Enhanced Cell-ID (positioning method)
- E-SMLC Evolved-Serving Mobile Location Centre
- ECGI Evolved CGI
- eNB E-UTRAN NodeB
- ePDCCH enhanced Physical Downlink Control Channel
- E-SMLC evolved Serving Mobile Location Center
- E-UTRA Evolved UTRA
- E-UTRAN Evolved UTRAN
- FDD Frequency Division Duplex
- FFS For Further Study
- GERAN GSM EDGE Radio Access Network
- gNB Base station in NR
- GNSS Global Navigation Satellite System
- GSM Global System for Mobile communication
- HARQ Hybrid Automatic Repeat Request
- HO Handover
- HSPA High Speed Packet Access
- HRPD High Rate Packet Data
- LOS Line of Sight
- LPP LTE Positioning Protocol
- LTE Long-Term Evolution
- MAC Medium Access Control
- MBMS Multimedia Broadcast Multicast Services
- MBSFN Multimedia Broadcast multicast service Single Frequency Network
- MBSFN ABS MBSFN Almost Blank Subframe
- MDT Minimization of Drive Tests
- MIB Master Information Block
- MME Mobility Management Entity
- MSC Mobile Switching Center
- NPDCCH Narrowband Physical Downlink Control Channel
- NR New Radio
- OCNG OFDMA Channel Noise Generator
- OFDM Orthogonal Frequency Division Multiplexing
- OFDMA Orthogonal Frequency Division Multiple Access
- OSS Operations Support System
- OTDOA Observed Time Difference of Arrival
- O&M Operation and Maintenance
- PBCH Physical Broadcast Channel
- P-CCPCH Primary Common Control Physical Channel
- PCell Primary Cell
- PCFICH Physical Control Format Indicator Channel
- PDCCH Physical Downlink Control Channel
- PDP Profile Delay Profile
- PDSCH Physical Downlink Shared Channel
- PGW Packet Gateway
- PHICH Physical Hybrid-ARQ Indicator Channel
- PLMN Public Land Mobile Network
- PMI Precoder Matrix Indicator
- PRACH Physical Random Access Channel
- PRS Positioning Reference Signal
- PSS Primary Synchronization Signal
- PUCCH Physical Uplink Control Channel
- PUSCH Physical Uplink Shared Channel
- RACH Random Access Channel
- QAM Quadrature Amplitude Modulation
- RAN Radio Access Network
- RAT Radio Access Technology
- RLM Radio Link Management
- RNC Radio Network Controller
- RNTI Radio Network Temporary Identifier
- RRC Radio Resource Control
- RRM Radio Resource Management
- RS Reference Signal
- RSCP Received Signal Code Power
- RSRP Reference Symbol Received Power OR Reference Signal Received Power
- RSRQ Reference Signal Received Quality OR Reference Symbol Received Quality
- RSSI Received Signal Strength Indicator
- RSTD Reference Signal Time Difference
- SCH Synchronization Channel
- SCell Secondary Cell
- SDU Service Data Unit
- SFN System Frame Number
- SGW Serving Gateway
- SI System Information
- SIB System Information Block
- SNR Signal to Noise Ratio
- SON Self Optimized Network
- SS Synchronization Signal
- SSS Secondary Synchronization Signal
- TDD Time Division Duplex
- TDOA Time Difference of Arrival
- TOA Time of Arrival
- TSS Tertiary Synchronization Signal
- TTI Transmission Time Interval
- UE User Equipment
- UL Uplink
- UMTS Universal Mobile Telecommunication System
- USIM Universal Subscriber Identity Module
- UTDOA Uplink Time Difference of Arrival
- UTRA Universal Terrestrial Radio Access
- UTRAN Universal Terrestrial Radio Access Network
- WCDMA Wide CDMA
- WLAN Wide Local Area Network

What is claimed is:

1. A method at a transmitting device for transmitting on multiple antennas, comprising transmitting at least two groups of reference signals, wherein a first and a second group of the at least two groups each correspond to transmission on a plurality of antenna ports, the first group corresponds to a smaller number of antenna ports than the second group, and the maximum combined power on the antenna ports corresponding to the first and second group is substantially the same, wherein, one or more of the antenna ports corresponding to the first group is formed according to at least one of a first and a second mechanism, wherein, the first mechanism comprises simultaneously transmitting on multiple transmit chains to form the antenna port, and/or the second mechanism comprises transmitting on an antenna port corresponding to the second group on a transmit chain of a plurality of transmit chains, wherein the transmit chain is capable of higher power transmission than other transmit chains in the plurality of transmit chains.

2. The method of claim 1, wherein the reference signal groups comprise at least one of:

an SRS resource containing at least one SRS port, an SRS resource set containing a plurality of SRS resources, each of which contains at least one SRS antenna port, and N DMRS ports associated with N layers of a PUSCH transmission.

3. The method of claim 1, wherein the transmitting device is configurable or configured to transmit a layer i of an L layer PUSCH either at a power $P_i$=P/L, where P is the total power to be used for PUSCH transmission, and/or $P_i$=PR/L, where R=M/K, M is a number of antenna ports with non-zero PUSCH transmission, and K is one of:

a maximum number of PUSCH layers supported by the UE, a number of antenna ports used in a codebook configured for the UE, a maximum rank configured to the UE, and a number of SRS ports configured to the UE for either or both of codebook and non-codebook based operation.

4. The method of claim 1, further comprising transmitting according to codebook based operation, wherein, optionally, each reference signal group is an SRS resource and/or at least one of a codebook and a maximum transmission rank is selected using an SRS resource indication.

5. The method of claim 1, further comprising transmitting according to non-codebook based operation, wherein, optionally, a reference signal group is an SRS resource set and/or SRI indicates SRS resources from different SRS resource sets, and/or only SRS resources in one SRS resource set are indicated at a time.

6. A user equipment comprising processing circuitry configured to transmit at least two groups of reference signals, wherein a first and a second group of the at least two groups each correspond to transmission on a plurality of antenna ports;

the first group corresponds to a smaller number of antenna ports than the second group; and the maximum combined power on the antenna ports corresponding to the first and second group is substantially the same, wherein, one or more of the antenna ports corresponding to the first group is formed according to at least one of a first and a second mechanism, wherein, the first mechanism comprises simultaneously transmitting on multiple transmit chains to form the antenna port; and the second mechanism comprises transmitting on an antenna port corresponding to the second group on a transmit chain of a plurality of transmit chains, wherein the transmit chain is capable of higher power transmission than other transmit chains in the plurality of transmit chains.

7. A base station comprising processing circuitry configured to receive at least two groups of reference signals, wherein a first and a second group of the at least two groups each correspond to transmission on a plurality of antenna ports;

the first group corresponds to a smaller number of antenna ports than the second group; and the maximum combined power on the antenna ports corresponding to the first and second group is substantially the same, wherein, one or more of the antenna ports corresponding to the first group is formed according to at least one of a first and a second mechanism, wherein, the first mechanism comprises simultaneously transmitting on multiple transmit chains to form the antenna port; and the second mechanism comprises transmitting on an antenna port corresponding to the second group on a transmit chain of a plurality of transmit chains, wherein the transmit chain is capable of higher power transmission than other transmit chains in the plurality of transmit chains.

* * * * *